United States Patent
Amagasa

(10) Patent No.: US 6,847,870 B2
(45) Date of Patent: Jan. 25, 2005

(54) SELF DIAGNOSTIC APPARATUS FOR VEHICLE INFORMATION DISPLAY SYSTEM

(75) Inventor: Yoshinori Amagasa, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 229 days.

(21) Appl. No.: 10/322,821

(22) Filed: Dec. 18, 2002

(65) Prior Publication Data

US 2003/0112134 A1 Jun. 19, 2003

(30) Foreign Application Priority Data

Dec. 18, 2001 (JP) ........................................ 2001-383853

(51) Int. Cl.[7] .......................... G05D 1/00; G01M 17/00
(52) U.S. Cl. ............................ 701/31; 701/29; 340/461
(58) Field of Search .............................. 701/35, 23, 29, 701/24, 25, 32, 31, 1, 200, 207, 208, 209, 210, 211, 213, 214, 34; 342/357.06, 357.08, 357.09; 340/438, 459, 460, 461

(56) References Cited

U.S. PATENT DOCUMENTS

| | | | | |
|---|---|---|---|---|
| 6,144,903 A | * | 11/2000 | Tousignant | 701/29 |
| 6,289,332 B2 | * | 9/2001 | Menig et al. | 707/1 |
| 6,292,723 B1 | * | 9/2001 | Brogan et al. | 701/29 |
| 6,502,021 B2 | * | 12/2002 | Wada et al. | 701/31 |
| 6,535,802 B1 | * | 3/2003 | Kramer | 701/29 |
| 6,587,759 B2 | * | 7/2003 | Obradovich et al. | 701/1 |

* cited by examiner

Primary Examiner—Richard M. Camby
(74) Attorney, Agent, or Firm—Smith, Gambrell & Russell, LLP

(57) ABSTRACT

A self diagnostic apparatus of a vehicle information display system for a vehicle for displaying vehicle information based on signals from the vehicle, comprises a self diagnosis switch for instructing self diagnoses of the display system, first judging means for judging whether or not the self diagnosis switch is turned on, second judging means for judging whether or not the display system inputs a signal to display vehicle information from the vehicle and self diagnosis means for performing a self diagnosis of the display system in case where it is judged by the first judging means that the self diagnosis switch is turned on and in case where it is judged by the second judging means that the display system does not input the signal to display vehicle information.

7 Claims, 5 Drawing Sheets

SELF DIAGNOSTIC APPARATUS FOR VEHICLE INFORMATION DISPLAY SYSTEM

BACKGROUND OF THE INVENTION

1. Field of the Invention

The present invention relates to a self diagnostic apparatus of a vehicle information display system such as an instrument panel of a vehicle for displaying vehicle information thereof.

2. Discussion of Related Arts

A vehicle has a vehicle information display system, for example, an instrument panel, for displaying miscellaneous information of the vehicle, incorporating a speed meter, an engine tachometer, a fuel level gauge, a water temperature indicator, an odometer, a trip meter and the like therein. The vehicle information display system (hereinafter referred to as an instrument panel) inputs various information from the vehicle through dedicated signal wires, serial transmission lines and the like and the self diagnosis for the instrument panel is performed based on this inputted information.

In thus constituted instrument panel, in order to perform diagnoses of the instrument panel, that is, in order to check for abnormal operation of a pointer of a meter, abnormal lighting of a lighting system and the like, miscellaneous signals are inputted from the vehicle through dedicated signal lines, serial transmission lines and self diagnoses of the instrument panel are performed based on these inputted signals.

However, in the aforesaid instrument panel having self diagnostic functions, since the self diagnoses are performed based on miscellaneous signals inputted from the vehicle through the dedicated signal lines or serial transmission lines, the instrument panel can not perform self diagnoses by itself, that is, in a condition of those lines disconnected from the vehicle.

SUMMARY OF THE INVENTION

It is an object of the present invention to provide a self diagnostic apparatus for an instrument panel capable of performing self diagnoses by itself.

In order to attain the object, a self diagnostic apparatus of a vehicle information display system for a vehicle for displaying vehicle information based on signals from the vehicle, comprises a self diagnosis switch for instructing a self diagnosis of the display system, first judging means for judging whether or not the self diagnosis switch is turned on, second judging means for judging whether or not the display system inputs a signal to display vehicle information from the vehicle and self diagnosis means for performing a self diagnosis of the display system in case where it is judged by the first judging means that the self diagnosis switch is turned on and in case where it is judged by the second judging means that the display system does not input the signal to display vehicle information.

DESCRIPTION OF PREFERRED EMBODIMENT

Figure 1:
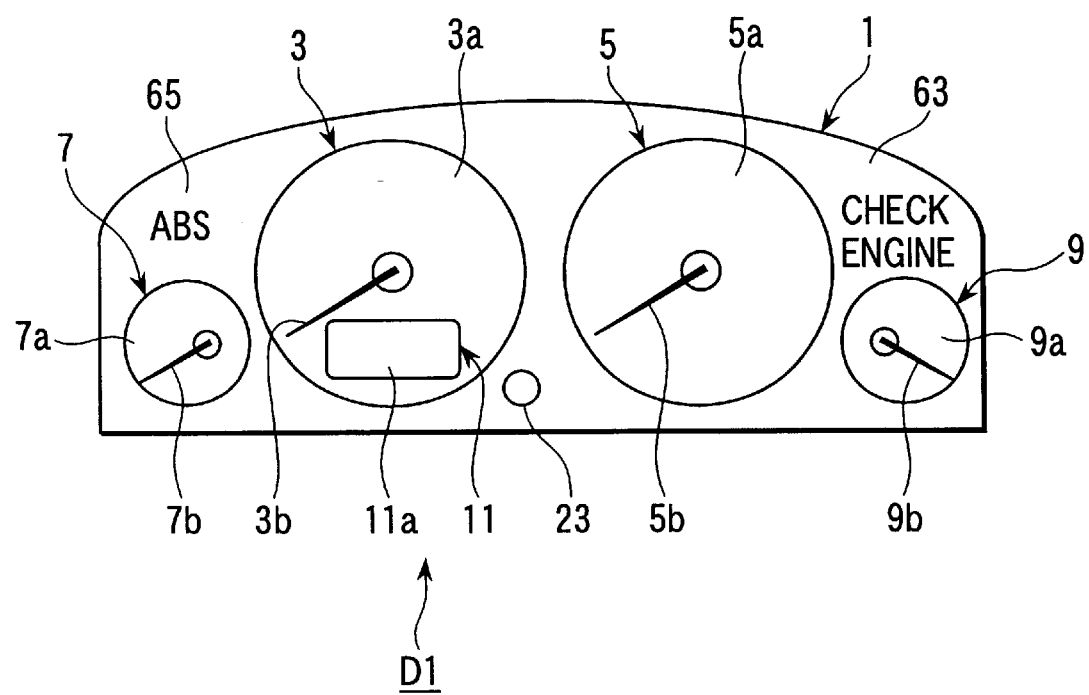
FIG. 1 is a schematic view showing a vehicle information display system for a vehicle according to an embodiment of the present invention.

Referring now to FIG. 1, an instrument panel D1 contains a speed meter 3, an engine speed meter (hereinafter referred to as a tachometer) 5, a fuel level gauge 7, a water temperature meter 9, a tripodometer 11 and the like in a meter cluster 1. The speed meter 3 has a dial section 3a and a needle section 3b and the tachometer 5 has a dial section 5a and a needle section 5b. Further, the fuel level gauge 7 includes a dial section 7a and a needle section 7b. Further, the water temperature meter 9 includes a dial section 9a and a needle section 9b and the trip-odometer 11 has a numerical display section 11a on which a traveling distance is displayed numerically.

Further, a warning light (check engine indicator) 63 for warning an abnormal engine injection system on self-diagnosing by lighting and a warning light (anti-lock brake warning) 65 for warning an abnormal ABS by lighting, are incorporated in the meter cluster 1. Further, a trip switch 23 for resetting the trip-odometer 11 and for selecting meters to be self-diagnosed is incorporated in the meter cluster 1.

Figure 2:
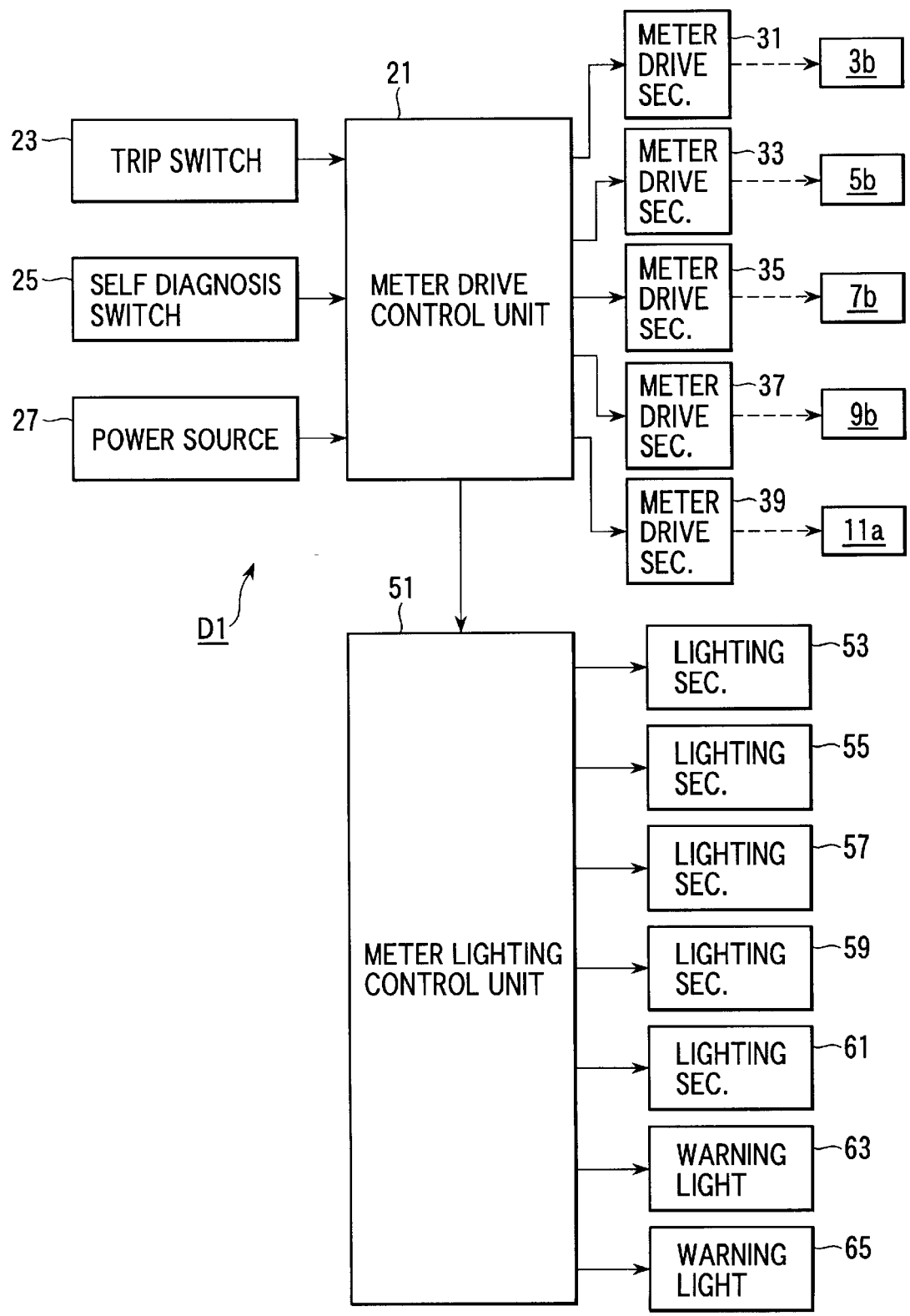
FIG. 2 is a block diagram showing a self diagnostic apparatus of a vehicle information display system according to an embodiment of the present invention.

Referring to FIG. 2, the instrument panel D1 has a meter drive control unit 21 and a meter lighting control unit 51. The meter drive control unit 21 includes a CPU (not shown), ROM (not shown), RAM (not shown) and the like. Further, the meter drive control unit 21 is connected with a trip switch 23, a self diagnosis switch 25 for instructing to perform a self diagnosis of the instrument panel D1 and a self diagnosis electric power source 27 for supplying power on self-diagnosing. Further, the meter drive control unit 21 is connected with a wheel speed sensor, an engine speed sensor, a fuel level sensor, and a water temperature sensor (these are not shown) and detected signals from these sensors are sent to the meter drive control unit 21. On the other hand, the meter drive control unit 21 is connected with meter drive sections 31, 33, 35, 37 and 39 respectively. Further, the meter drive control unit 21 is connected with the meter lighting control unit 51.

The meter drive control unit 21 executes miscellaneous calculations according to control programs stored in ROM and the like based on signals inputted and controls indicative signals in the respective meters 3, 5, 7 and 11. Further, when self-diagnoses of the instrument panel D1 are performed, the meter drive control unit 21 outputs control signals for driving the respective meters to the meter drive sections 31, 33, 35 and 39. Further, when self diagnoses of the instrument panel D1 are performed, the meter drive control unit 21 outputs control signals for performing self diagnoses of the lighting sections and the warning lights to the meter lighting control unit 51.

The meter lighting control unit 51 has CPU, ROM, RAM and the like (these are not shown). The meter lighting control unit 51 is connected with lighting sections 53, 55, 57, 59, 61 and warning lights 63, 65 which are provided for respective meters 3, 5, 7, 9 and 11 respectively.

The meter lighting control unit 51 executes calculations according to programs stored in ROM and the like to control switching-ON and switching-OFF and brightness of the lighting sections 53, 55, 57, 59 and 61 and to control switching-ON and switching-OFF of the warning lights 63 and 65.

Further, when self diagnoses of the instrument panel D1 are performed, based on control signals from the meter drive control unit 21, the meter lighting control unit 51 controls switching-ON and switching-OFF and brightness of the lighting sections 53, 55, 57, 59 and 61 and controls switching-ON and switching-OFF of the warning lights 63 and 65. In FIG. 2, the meter lighting control unit 51 and the meter drive control unit 21 are separated from each other, however these may be integrated into one control unit.

Figure 3:
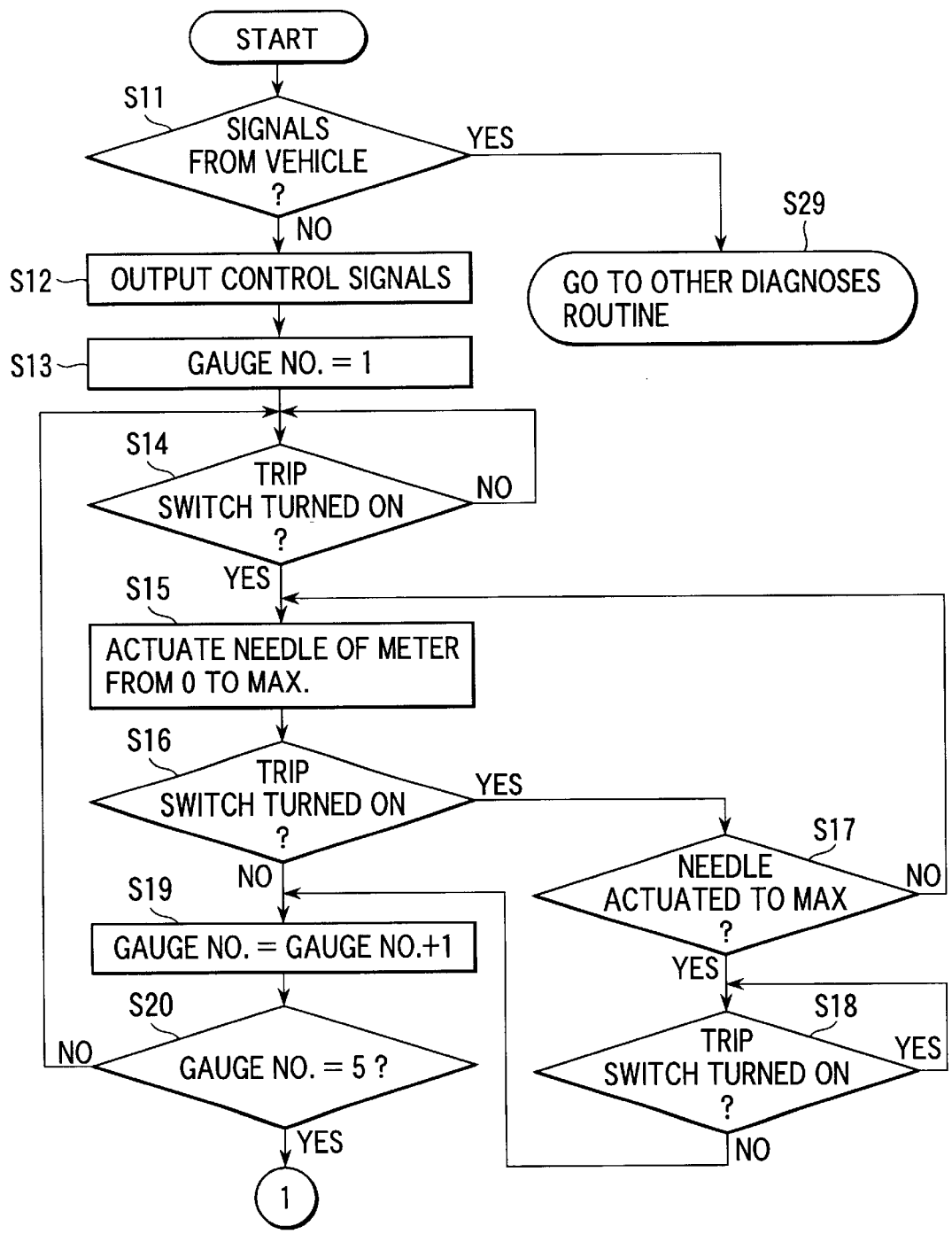
FIG. 3 is a flowchart for explaining an operation of the self diagnostic apparatus of the vehicle information display system according to an embodiment of the present invention.
Figure 4:
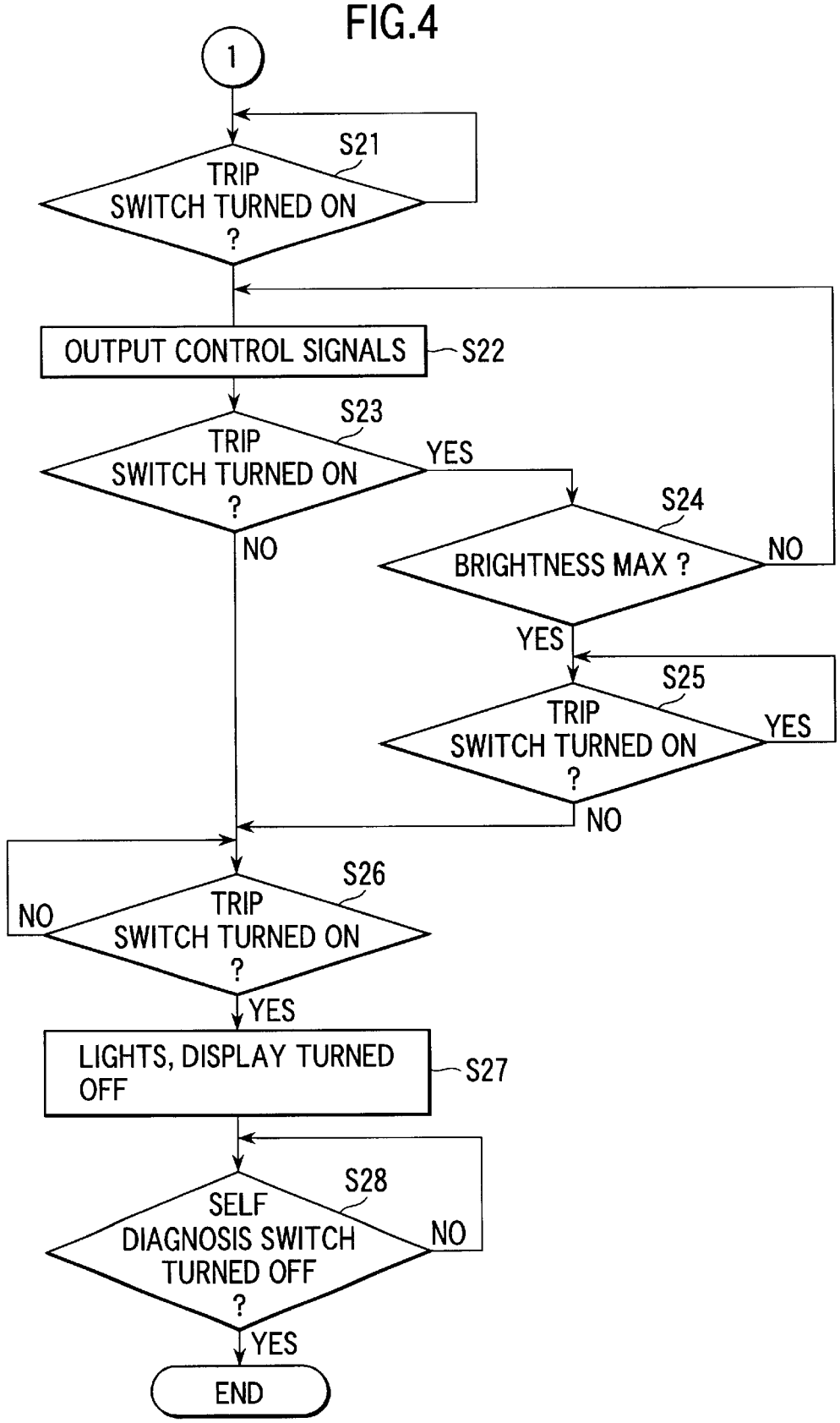
FIG. 4 is a flowchart continued from FIG. 3.

Referring to a flowchart shown in FIG. 3 and FIG. 4, the operation of the self diagnostic apparatus of the instrument panel will be described. First, when it is detected in the meter drive control unit 21 that the self diagnosis switch 25 is turned on, a self diagnosis processing routine of the instrument panel starts.

First, at a step S11, it is judged whether or not signals for displaying vehicle information through dedicated signal lines or serial transmission lines are inputted from a vehicle. In case where it is judged that the signals are not inputted through the dedicated signal lines or the serial transmission lines, the program goes to a self diagnosis mode of the instrument panel in which self diagnoses of the instrument panel D1 start. That is, in case where, since it is estimated that failures exist in other systems than the meter system, the program goes to a step S29 where another routine for diagnosing other systems starts. Since the routine for diagnosing other systems are not associated with the disclosure contents, the description of the routine is omitted.

First, the meter drive control unit 21 outputs control signals for lighting the lighting section 53, 55, 57, 59 and 61 at a specified brightness to the meter lighting control unit 51. Based on the control signals, the meter lighting control unit 51 lights the lighting sections 53, 55, 57, 59 and 61 at a specified brightness respectively. Further, the meter drive control unit 21 lights the numerical display section 11a of the tripodometer 11 and the warning lights 63 and 65. Further, at a section 12 the meter drive control unit 21 outputs to the meter drive sections 31, 33, 35, 37 and 39 so that the needle sections 3b, 5b, 7b and 9b of the respective meters 3, 5, 7, 9 and 11 indicate zero (0).

Next, at a step S13, a meter to be firstly self-diagnosed is designated as Gauge No. 1. In this embodiment, Gauge No. 1 is the speed meter 3, Gauge No. 2 is the tachometer 5, Gauge No. 3 is the fuel gauge 7 and Gauge No. 4 is the water temperature 9.

Figure 5:
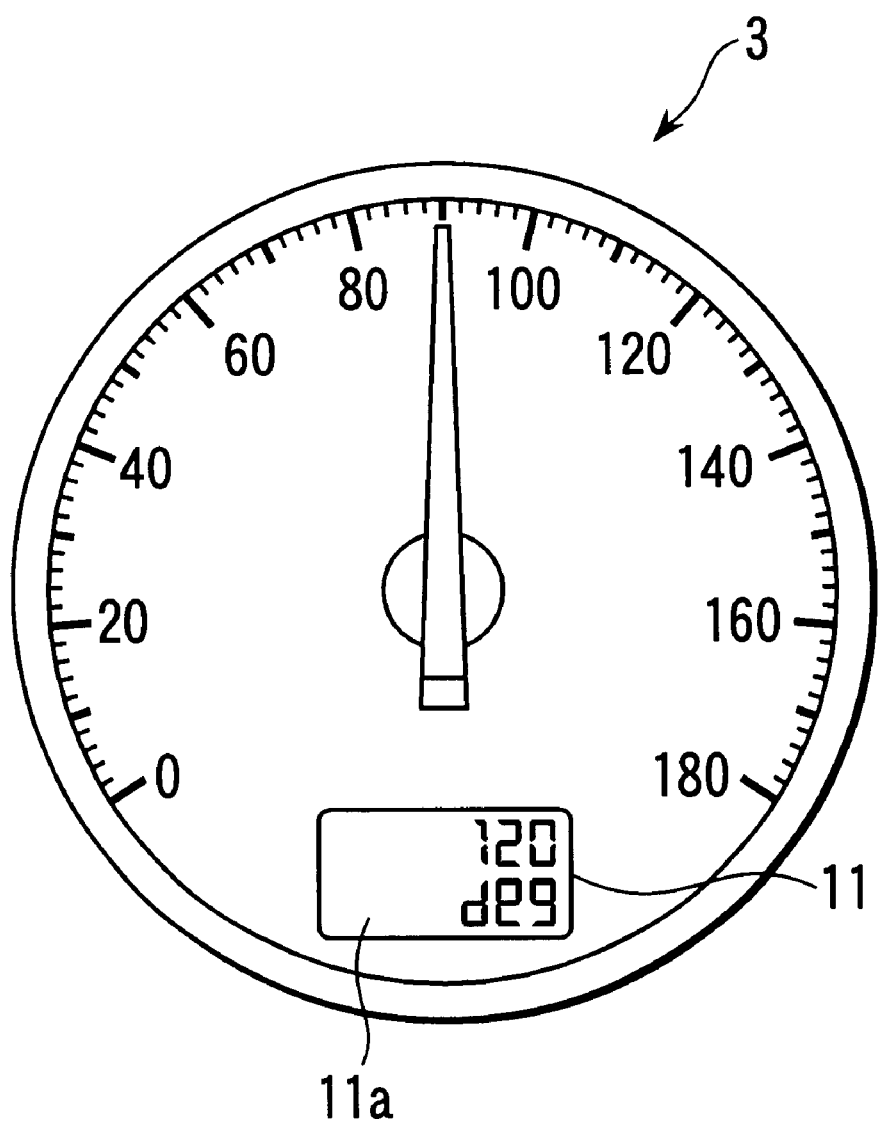
FIG. 5 is a view showing an example of a display when a self diagnostic apparatus operates.

Next, at a step S14, it is judged whether or not the trip switch 23 is turned on. In case where the trip switch 23 is turned on, at a step S15 the needle section 3b of the speed meter 3 deflects from the 0 position to the maximum position. In this case, as shown in FIG. 5, the angle of deflection of the needle is displayed in the numerical display section 11a of the tripodometer 11.

Next, at a step S16 it is judged whether or not the trip switch 23 is continued to be turned on. In case where the trip switch 23 is continued to be turned on, the program goes to a step S17 in which it is judged whether or not the needle section 3b of the speed meter 3 deflects up to the maximum position. In this case, if the needle section 3b does not deflects up to the maximum position, the program returns to the step S15 where the operation of the needle section 3b is continued.

On the other hand, in case where it is judged at the step S17 that the needle section 3b of the speed meter 3 deflects up the maximum position and after that it is judged at a step S18 that the trip switch 23 is turned off, or in case where the trip switch 23 is turned off before the needle section 3b of the speed meter 3 deflects up to the maximum position, the gauge number is stepped up by 1 at a step S19. Then, at a step S20, it is checked whether or not the gauge number is equal to 5, that is, all the meters have been self-diagnosed.

In this case, since the gauge number is 2, the program returns to the step S14 where the self diagnosis of the tachometer 5 is performed in the same way as that of the speed meter 3. Hereinafter, the self diagnoses are performed similarly for the fuel level gauge 7 (Gauge No. 3) and the water temperature 9 (Gauge No. 4).

In case where it is judged at the step S20 that the self diagnoses finish for all meters, the self diagnoses of the lighting sections 53, 55, 57, 59 and 61 start. First, at a step S21, it is judged whether or not the trip switch 23 is turned on. In case where the trip switch 23 is turned on, at a step S22 the drive control unit 21 outputs control signals for controlling the brightness of the lighting sections 53, 55, 57, 59 and 61 to the meter lighting control unit 51. Based on these control signals, the meter lighting control unit 51 controls so as to gradually increase the brightness of the lighting sections 53, 55, 57, 59 and 61 from the minimum level to the maximum level, respectively. In this case, respective brightness level numbers are displayed in the numerical display section 11a of the trip meter 11.

Next, at a step S23, it is judged whether or not the trip switch 23 is continued to be turned on. In case where the trip switch 23 is continued to be turned on, at a step S24, it is judged whether or not the brightness of the respective lighting sections 53, 55, 57, 59 and 61 reaches the maximum level. If the brightness does not reach the maximum level, the program returns to the step S22 where the brightness of the lighting sections 53, 55, 57, 59 and 61 is controlled so as to gradually increase from the minimum level to the maximum level.

On the other hand, in case where it is judged at a step 24 that the brightness of the lighting sections 53, 55, 57, 59 and 61 reaches the maximum level respectively, and after that, in case where it is judged at a step S25 that the trip switch 23 is turned off, or in case where at the step S23 the trip switch 23 is turned off before the brightness of the lighting sections 53, 55, 57, 59 and 61 reaches the maximum level respectively, the program goes to a step S26 where it is judged again whether or not the trip switch 23 is tuned on. If the trip switch 23 is turned on, at the next step S27 the lighting sections 53, 55, 57, 59, 61, the warning lights 63 and 65 and the numerical display section 11a are turned off. Further, at a step S28 it is judged whether or not the self diagnosis switch 25 is turned off. If it is detected that the self diagnosis switch 25 is turned off, the self diagnosis of the instrument panel D1 finishes. The lighting sections 53, 55, 57, 59, 61, the warning lights 63 and 65 may be adjusted independently in order.

According to the self diagnostic apparatus of the instrument panel, in case where the instrument panel D1 is disconnected from a vehicle body and is in such a condition as having no input signals from the vehicle, the self diagnosis of the instrument panel D1 can be performed. Therefore, the instrument panel D1 can be self-diagnosed independently on the way of development.

Further, according to the self diagnostic apparatus of the instrument panel, since the number of times of switching the trip switch 23 on determines object meters or lighting sections to be self-diagnosed, it is not necessary to provide switches for selecting meters or lighting sections to be self-diagnosed.

In summary, according to the present invention, in case where it is judged based on a first judging means that the self diagnosis switch is turned on and in case where it is judged based on a second judging means that no signal is inputted from a vehicle body to the instrument panel, the self diagnoses are performed by self diagnosis means. Accordingly, in case where there is no signal input from the vehicle, for example, in case where the instrument panel is disconnected from the vehicle, et cetera, overall self diagnoses of the instrument panel can be performed. Further, information display means to be self-diagnosed or lighting means to be self-diagnosed can be selected by actuating a selection switch.

The entire contents of Japanese Patent Application No. Tokugan 2001-383853 filed Dec. 18, 2001, is incorporated herein by reference.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. A self diagnostic apparatus of a vehicle information display system for a vehicle for displaying vehicle information based on signals from said vehicle, comprising:
    a self diagnosis switch for instructing a self diagnosis of said vehicle information display system;
    first judging means for judging whether or not said self diagnosis switch is turned on;
    second judging means for judging whether or not said vehicle information display system inputs a signal to display said vehicle information from said vehicle; and
    self diagnosis means for performing a self diagnosis of said vehicle information display system in case where it is judged by said first judging means that said self diagnosis switch is turned on and in case where it is judged by said second judging means that said vehicle information display system does not input said signal to display said vehicle information.

2. The self diagnostic apparatus according to claim 1, wherein said vehicle information display system has a plurality of information display means for displaying vehicle information and a first selection switch for selecting information displaying means to be self-diagnosed out of said plurality of said information display means and said self diagnosis means perform said self diagnosis of said information display means selected by said selection switch.

3. The self diagnostic apparatus according to claim 1, wherein said vehicle information display system has lighting means for lighting said information display means and a second selection switch for selecting said lighting means to be self-diagnosed and said self diagnosis means perform said self diagnosis of said lighting means in case where said lighting means are selected by said second selection switch.

4. The self diagnostic apparatus according to claim 2, wherein said first selection switch is a trip switch and said information display means are selected based on the number of times of switching of said trip switch.

5. The self diagnostic apparatus according to claim 2, wherein said first selection switch is a trip switch and said lighting means are selected based on the number of times of switching of said trip switch.

6. The self diagnostic apparatus according to claim 3, wherein said second selection switch is a trip switch and said information display means are selected based on the number of times of switching of said trip switch.

7. The self diagnostic apparatus according to claim 3, wherein said second selection switch is a trip switch and said lighting means are selected based on the number of times of switching of said trip switch.

* * * * *